(12) United States Patent
Sugisawa

(10) Patent No.: US 6,420,966 B2
(45) Date of Patent: Jul. 16, 2002

(54) METHOD FOR ALARMING DECREASE IN TIRE AIR-PRESSURE AND APPARATUS USED THEREFOR

(75) Inventor: Toshifumi Sugisawa, Kobe (JP)

(73) Assignees: Sumitomo Rubber Industries, Ltd., Hyogo-Ken; Sumitomo Electric Industries, Ltd., Osaka-fu, both of (JP)

( * ) Notice: Subject to any disclaimer, the term of this patent is extended or adjusted under 35 U.S.C. 154(b) by 0 days.

(21) Appl. No.: 09/885,128

(22) Filed: Jun. 21, 2001

(30) Foreign Application Priority Data

Jun. 21, 2000 (JP) ........................................ 2000-186129
Jun. 30, 2000 (JP) ........................................ 2000-199106

(51) Int. Cl.[7] ............................................... B60C 23/00
(52) U.S. Cl. ...................... 340/442; 340/441; 340/443; 340/444; 340/445; 340/446; 73/146.1; 73/146.2; 73/146.5; 701/36; 701/38; 701/39; 701/65
(58) Field of Search ................................. 340/442, 441, 340/425.5, 438, 443, 444, 445, 446, 447; 73/146.1, 146.2, 146.5; 701/36, 38, 39, 65

(56) References Cited

U.S. PATENT DOCUMENTS 5,513,523 A * 5/1996 Sekiya et al. .................. 73/146
5,591,906 A * 1/1997 Okawa et al. ............. 73/146.5
5,753,809 A * 5/1998 Ogusu et al. .............. 73/146.2
5,764,137 A * 6/1998 Zarkhin ...................... 340/444
5,828,975 A * 10/1998 Isshiki et al. ................. 701/72
5,936,519 A * 8/1999 Nakajima et al. ........... 340/444
5,939,626 A * 8/1999 Tominaga et al. ......... 73/146.2
6,137,400 A * 10/2000 Yanase et al. ............... 340/442

* cited by examiner

Primary Examiner—Daniel J. Wu
Assistant Examiner—Tai T. Nguyen
(74) Attorney, Agent, or Firm—Birch, Stewart, Kolasch & Birch, LLP

(57) ABSTRACT

An apparatus for alarming decrease in tire air-pressure based on rotational information obtained from tires, comprising a rotational information detecting means for detecting rotational information of each tire, a steering angle detecting means, a memory means for storing the rotational information of each tire and the steering angle, a turning radius calculating and processing means, a judged value calculating and processing means, and a correction means for correcting the turning radius. It is possible to obtain an accurate turning radius also in case any tire of the following wheels is decompressed by correcting the turning radius obtained on the basis of rotational information by using the steering angle information, thereby the DEL value might be obtained in a more accurate manner than compared to conventional arrangements.

10 Claims, 6 Drawing Sheets

METHOD FOR ALARMING DECREASE IN TIRE AIR-PRESSURE AND APPARATUS USED THEREFOR

BACKGROUND OF THE INVENTION

The present invention relates to a method for alarming decrease in tire air-pressure and an apparatus used therefor. More particularly, it relates to a method for alarming decrease in tire air-pressure and an apparatus used therefor with which it is possible to accurately perform cornering correction and to improve the accuracy of detecting a decompressed condition of a tire.

A conventional apparatus for detecting decrease in tire air-pressure (DWS system) determines a decompressed condition of a tire based on information of four ABS wheel speed sensors. In case a vehicle performs cornering, the load will be shifted to the outside owing to the effect of lateral acceleration. Since the respective longitudinal load and slip ratio of the right and left tires are different at that time, it is impossible to determine a decompressed condition. In order to cope with problem, a conventional DWS performs cornering correction by obtaining a cornering radius (turning radius) based on a wheel speed ratio of the inner and outer following wheels (which are the rear wheels in the case of a FF vehicle and the front wheels in the case of a FR vehicle) and calculating an amount of change in longitudinal load and an amount of change in slip ratio accompanying the shift of load on the basis of the obtained value.

However, while a difference in rotation of the right and left following wheels will be caused as a result of a decompressed condition of either following wheel, it cannot be immediately determined whether this difference in rotation is due to a decompressed tire or merely due to cornering. Since it is rarely the case that cornering movements will last for longer than several tens of seconds when driving on a public road, wheel ratios of right and left following and driving wheels are obtained for approximately one minute and a decompressed condition of the following tire is determined in case a difference between these values exceeds a specified value.

It will therefore take approximately one minute for determining whether the difference in rotation is due to cornering or the difference in rotation is due to a decompressed tire when determining a decompressed condition of the tire. Though very rare, it might happen that malfunctions in performing determination occur in the case of certain values for the longitudinal load or slip ratio, and erroneous alarm might be issued upon determining that the difference in rotation is due to cornering though actually due to a decompressed tire or vice versa, determining a decompressed condition of the tire though the vehicle is actually performing cornering.

The present invention has been made in view of these facts, and it is an object of the present invention to provide a method for alarming decrease in tire air-pressure and an apparatus used therefor which is capable of accurately performing cornering correction and to improve the accuracy of detecting a decompressed condition.

SUMMARY OF THE INVENTION

In accordance with a first aspect of the present invention, there is provided an apparatus for alarming decrease in tire air-pressure based on rotational information obtained from tires attached to a four-wheeled vehicle, comprising: a rotational information detecting means for detecting rotational information of each tire; a steering angle detecting means for detecting a steering angle; a memory means for storing the rotational information of each tire and the steering angle; a turning radius calculating and processing means for calculating a turning radius based on the rotational information of each tire; a judged value calculating and processing means for calculating a judged value based on the rotational information of each tire; and a correction means for correcting the turning radius in case it has been determined by the steering angle detecting means that the vehicle is in a straight-ahead driving condition though the driving condition of the vehicle is a turning condition when being based on the turning radius obtained on the basis of the rotational information.

In accordance with a second aspect of the present invention, there is provided an apparatus for alarming decrease in tire air-pressure based on rotational information obtained from tires attached to a four-wheeled vehicle, comprising: a rotational information detecting means for detecting rotational information of each tire; a steering angle detecting means for detecting a steering angle; a memory means for storing the rotational information of each tire and the steering angle; a turning radius calculating and processing means for calculating a turning radius based on the rotational information of each tire; a correction means for correcting the turning radius in case it has been determined by the steering angle detecting means that the vehicle is in a straight-ahead driving condition though the driving condition of the vehicle is a turning condition when being based on the turning radius obtained on the basis of the rotational information; and a decompression determining means for determining a decompressed condition of a tire in case a correction coefficient for the turning radius as obtained by the correction means is not less than a threshold.

In accordance with a third aspect of the present invention, there is provided a method for alarming decrease in tire air-pressure based on rotational information obtained from tires attached to a four-wheeled vehicle, comprising the steps of; detecting rotational information of each tire; detecting a steering angle; storing the rotational information of each tire and the steering angle; calculating a reciprocal of a turning radius based on the rotational information of each tire; calculating a judged value based on the rotational information of each tire; and correcting, when performing correction of the judged value for decompressed condition due to cornering, the turning radius in case it has been determined on the basis of the steering angle that the vehicle is in a straight-ahead driving condition though the driving condition of the vehicle is a turning condition when being based on the turning radius obtained on the basis of the rotational information.

In accordance with a fourth aspect of the present invention, there is provided a method for alarming decrease in tire air-pressure based on rotational information obtained from tires attached to a four-wheeled vehicle, comprising the steps of: detecting rotational information of each tire; detecting a steering angle; storing the rotational information of each tire and the steering angle; calculating a turning radius based on the rotational information of each tire; correcting the turning radius in case it has been determined on the basis of the steering angle that the vehicle is in a straight-ahead driving condition though the driving condition of the vehicle is a turning condition when being based on the turning radius obtained on the basis of the rotational information; and determining a decompressed condition of a tire in case a correction coefficient for the turning radius as obtained during the correction process is not less than a threshold.

In accordance with a fifth aspect of the present invention, there is provided an apparatus for alarming decrease in tire air-pressure based on rotational information obtained from tires attached to a four-wheeled vehicle, comprising: a rotational information detecting means for detecting rotational information of each tire; a memory means for storing the rotational information of each tire; a calculating and processing means for calculating a judged value based on the rotational information of each tire; and a judged value correcting means for correcting the judged value based on a lateral acceleration obtained through a lateral acceleration sensor provided in the vehicle.

In accordance with a sixth aspect of the present invention, there is provided an apparatus for alarming decrease in tire air-pressure based on rotational information obtained from tires attached to a four-wheeled vehicle, comprising: a rotational information detecting means for detecting rotational information of each tire; a memory means for storing the rotational information of each tire; a calculating and processing means for calculating a judged value based on the rotational information of each tire; and a judged value correcting means for correcting the judged value based on a lateral acceleration obtained on a basis of values of a yaw rate sensor provided in the vehicle.

In accordance with a seventh aspect of the present invention, there is provided a method for alarming decrease in tire air-pressure based on rotational information obtained from tires attached to a four-wheeled vehicle, comprising the steps of: detecting rotational information of each tire; storing the rotational information of each tire; calculating a judged value based on the rotational information of each tire; and correcting the judged value based on a lateral acceleration obtained through a lateral acceleration sensor provided in the vehicle.

In accordance with a eighth aspect of the present invention, there is provided a method for alarming decrease in tire air-pressure based on rotational information obtained from tires attached to a four-wheeled vehicle, comprising the steps of: detecting rotational information of each tire; storing the rotational information of each tire; calculating a judged value based on the rotational information of each tire; and correcting the judged value based on a lateral acceleration obtained on a basis of values of a yaw rate sensor provided in the vehicle.

DETAILED DESCRIPTION

Embodiment 1

A method for alarming decrease in tire air-pressure and an apparatus used therefor according to the present invention will now be explained based on the accompanying drawings.

Figure 1:
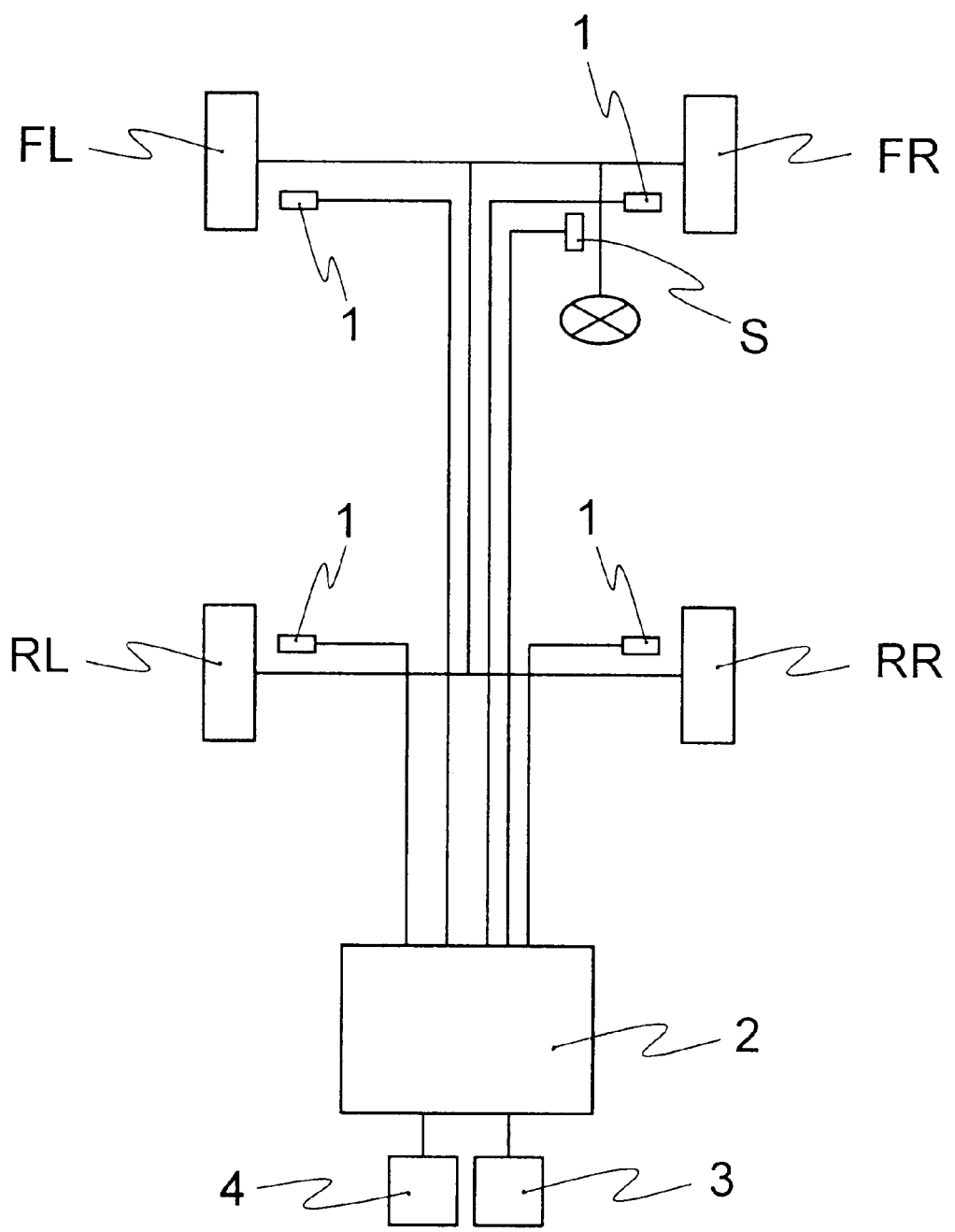
FIG. 1 is a block diagram illustrating one embodiment of an apparatus for alarming decrease in tire air-pressure according to the present invention.

As shown in FIG. 1, the apparatus for alarming decrease in air-pressure according to Embodiment 1 of the present invention is for detecting whether an air-pressure of any of four wheels FL, FR, RL and RR ($W_i$, i=1 to 4, 1: front left tire, 2: front right tire, 3:rear left tire, and 4:rear right tire) attached to a four-wheeled vehicle has decreased or not, and comprises ordinary rotational information detecting means 1 respectively arranged in connection with each of the tires $W_i$ and a steering angle detecting means S for detecting a steering angle of the wheels.

The rotational information detecting means 1 might be a wheel speed sensor for generating rotational pulse by using an electromagnetic pickup or similar device to obtain wheel speeds (rotational speeds) on the basis of the number of pulses, or an angular velocity sensor including those in which electricity is generated by utilizing rotation such as a dynamo to obtain the wheel speed on the basis of the voltage thereof. The steering angle detecting means S might be an ordinary steering angle sensor. Outputs of the rotational information detecting means 1 and the steering angle detecting means are supplied to a control unit 2 such as an ABS. To the control unit 2, there are connected a display means 3 composed of liquid crystal display elements, plasma display elements, or CRT for informing a tire $W_i$ of which air-pressure has decreased, and an initialization switch 4 which might be operated by the driver.

Figure 2:
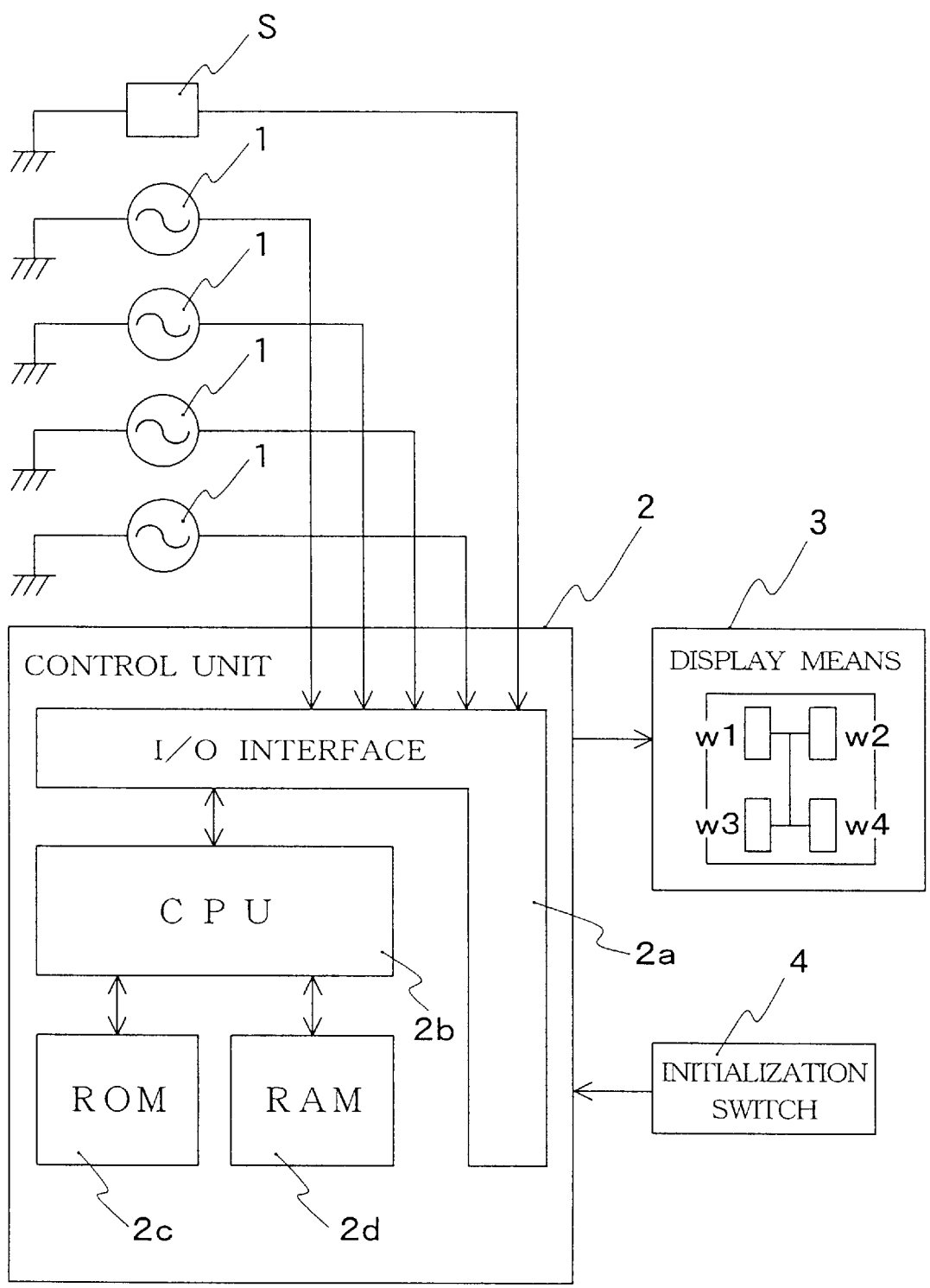
FIG. 2 is a block diagram illustrating electric arrangements of the apparatus for alarming decrease in tire air-pressure of FIG. 1.

The control unit 2 comprises, as shown in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations. The turning radius calculating and processing means, judged value calculating and processing means and turning radius correcting means in the present Embodiment 1 are included in the control unit 2.

Each rotational information detecting means 1 outputs a pulse signal corresponding to the number of revolution of the tire $W_i$ (hereinafter referred to as "wheel velocity pulse"). The CPU 2b calculates a rotational angular velocity $F_i$ for each tire $W_i$ at a specified sampling period $\Delta T$ (sec), for instance, each $\Delta T$=1 second, based on the wheel velocity pulse output from the 1.

Since tires $W_i$ are manufactured to include variations (initial differences) within specifications, it is not always the case that effective rolling radii of respective tires $W_i$ (values obtained by dividing a distance which has been traveled through a single rotation with $2\pi$) are identical even though all of the tires $W_i$ are at normal internal pressure. Thus, the rotational angular velocity $F_i$ for each tire $W_i$ will be varied. In order to cancel such variations owing to initial differences, a corrected rotational angular velocity $F1_i$ is calculated. More particularly, the following corrections are made:

$F1_1 = F_1$
$F1_2 = mF_2$
$F1_3 = F_3$
$F1_4 = nF_4$

The correction coefficients m, n are obtained by calculating a rotational angular velocity $F_i$ under a condition, for instance, that the vehicle is performing straight-ahead running and obtained as $m = F_1/F_2$ and $n = F_3/F_4$ based on the calculated rotational angular velocity $F_i$.

Based on the above $F1_i$, speed V of the vehicle is obtained using the following equation.

$$V = (V1 + V2 + V3 + V4)/4$$

Here, V(i): wheel speed of the tire (m/sec)

i: 1=front left tire, 2=front right tire, 3=rear left tire, and 4=rear right tire.

A decompression judged value (DEL) for detecting decrease in air-pressure of tire $W_i$ is for comparing a difference between two diagonal sums of, for instance, the front wheel tires and rear wheel tires, and is obtained from the following equation (1) which is a ratio of a value obtained by subtracting a sum of signals of one pair of diagonally located wheels from a sum of signals of the other pair of diagonally located wheels to an average value of the two sums:

$$DEL = \frac{2 \times \{(V1 + V4) - (V2 + V3)\}}{V1 + V2 + V3 + V4} \times 100(\%) \quad (1)$$

Since lateral G is generated towards the outside of the corner in case the vehicle is performing cornering, a larger load is applied on the outer tires while the load applied on the inner tires will decrease. The amount of shift in load at this time is proportional to the lateral G which has been generated through cornering. The radius of rotation of the tires will also be changed through the shift in load, and this amount of change is also substantially proportional to the amount of shift in load.

The amount of change in the radius of rotation of the tires might thus be given as a linear expression of the lateral G.

On the other hand, slip of the driving wheels will increase in accordance with a decrease in load of the tires. Thus, slip of the driving tires outside of the corner will decrease while the slip inside thereof increases. The average slip amount of the right and left tires owing to cornering being substantially identical and the amount of shift in slip rate being further proportional to the amount of shift in load, the amount of shift in slip rate might be considered to be substantially proportional to the average slip amount.

Thus, variable components of the DEL values owing to lateral G might be given by the following equation (2) based on the linear expression for the lateral G and the linear expression for the average slip rate.

Variable component of DEL=lateral G×(constant 1+DFR×constant 2) (2)

Here, though the constant 1 is a primary coefficient of the lateral G affected by the shift in load, it is expressed as a difference in influence of rotating radius between the front and rear by the shift in load since the amount of shift in load is not identical for the front and rear shafts.

The corrected DEL (cornering correction) might thus be given by the following equation (3).

Corrected DEL=DEL–lateral G×(constant 1+DFR×constant 2) (3)

It should be noted that DFR denotes a slip rate of the driving wheels that is obtained by $(V1+V2)/(V3+V4)-1$ in the case of FF (front engine/front drive) and FF based 4WD vehicles and by $(V3+V4)/(V1+V2)-1$ in the case of FR (front engine/rear drive) vehicles.

The lateral G (lateral acceleration G) might be given by equation (4) based on the balance thereof with centrifugal force at the time of turning the vehicle.

$Lateral\ G=V^2/R/9.8$ (4)

The reciprocal (RECPR) of the turning radius R of the vehicle in the above equation (4) can be obtained from the following equation (5) in the case of a FF driving vehicle.

$RECPR=\{(V3-V4)/(V3+V4)\times RT_{WD}\}/(1+4\times V2\times constant3/(2\times 9.8\times RT_{WD}))$ (5)

Here, $RT_{WD}$ denotes a tread width (m) of the rear wheels.

The constant 1, constant 2 and constant 3 in the above equation (3) and equation (5) can be obtained through calculation in the control unit based on the lateral G, DEL and DFR, respectively which are obtained on the basis of wheel speed obtained by the speed sensor of the vehicle while the vehicle is running on a corner with the tires being at normal internal pressure. Since variations will occur in the constants 1 to 3 depending on the values of the lateral G and the DFR, it is preferable to utilize mean values of the respective variations.

The reason why the RECPR is calculated on the basis of the rear wheels is that the following wheels are less affected by the driving. The effects of cornering can be decreased to a remarkable extent by using equation (5). However, it is a premise of equation (5) that the rear wheels are at normal internal pressure. Thus, in case the rear wheels should be decompressed, the calculated turning radius might be wrong so as to cause malfunctions. In another case in which two wheels on either the right or left side are decompressed, no determination can be made using the DEL of equation (1). This is because the value of DEL of equation (1) will not change in case the two wheels on, for instance, the left side are decompressed since the wheel speed V1 and the wheel speed V3 will increase by substantially the same degree.

Figure 3:
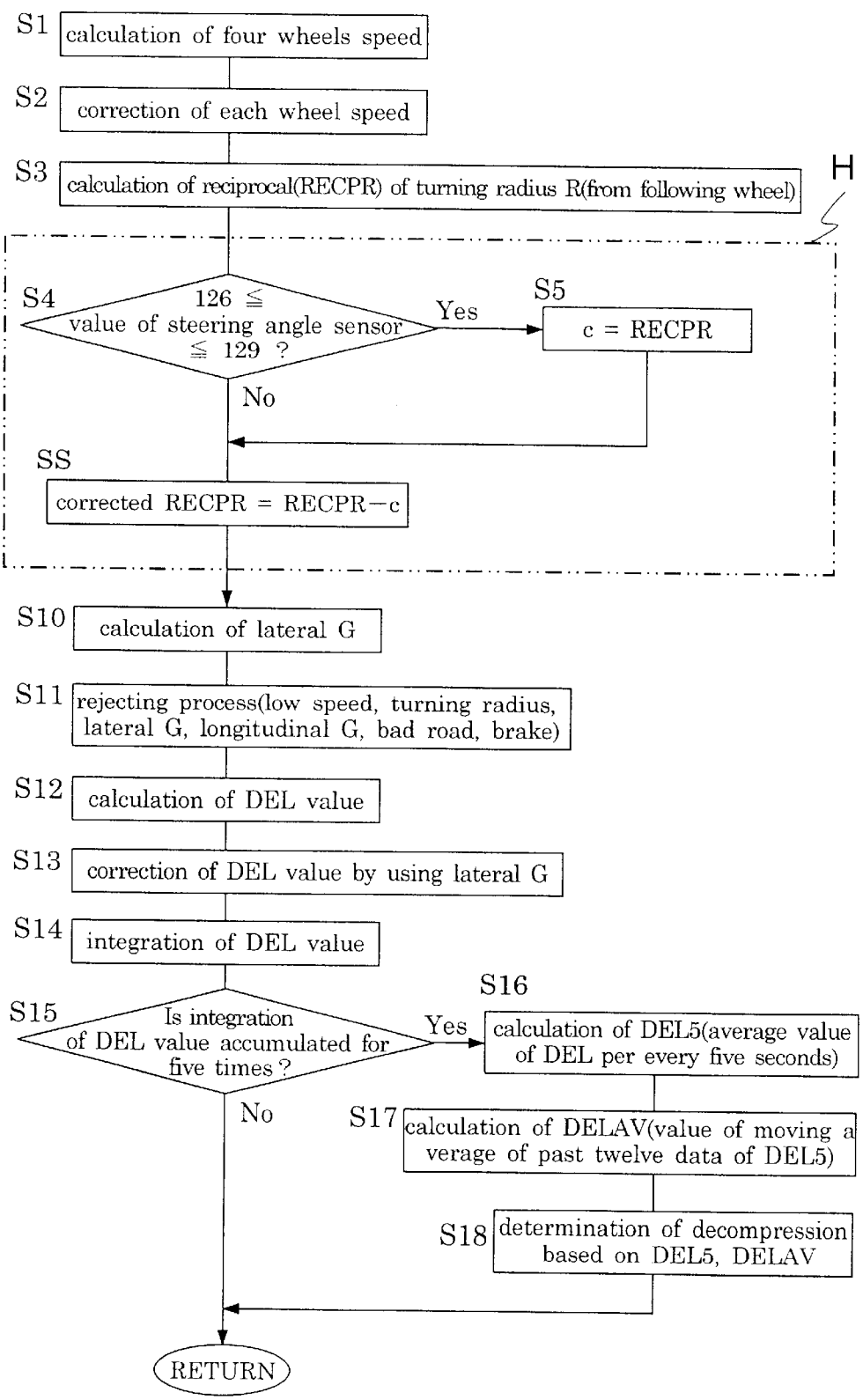
FIG. 3 is a flowchart related to the present invention.
Figure 4:
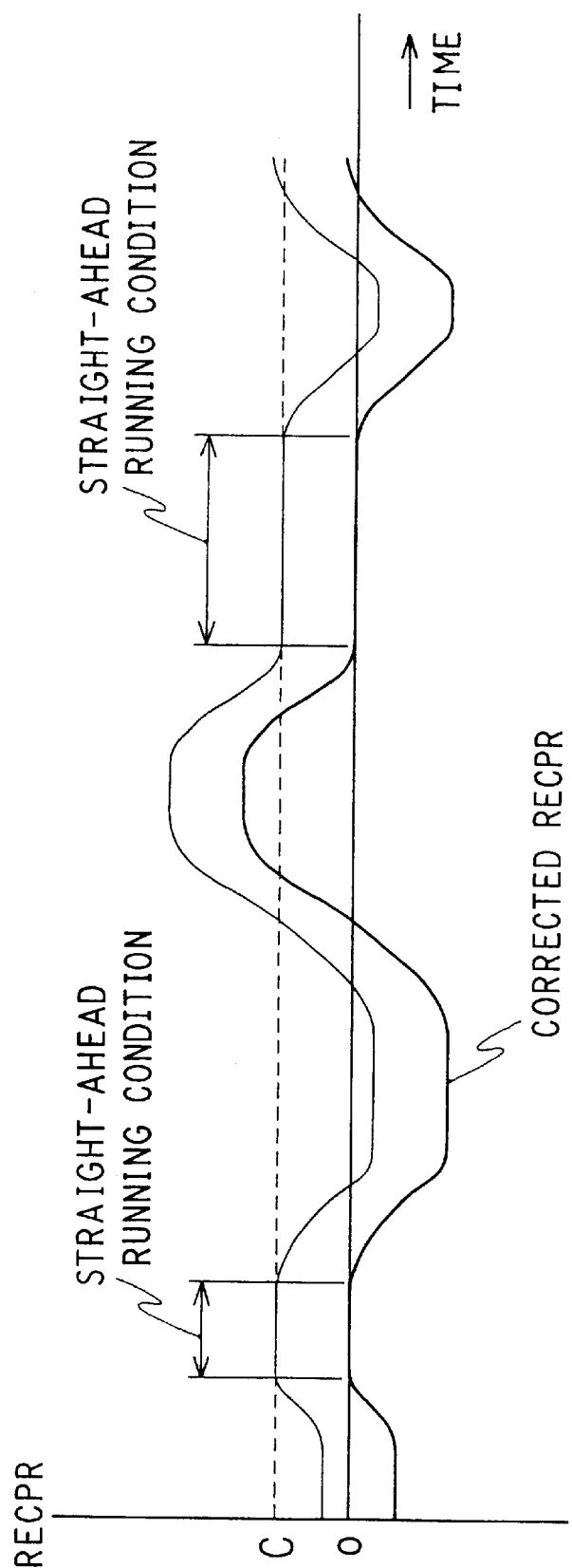
FIG. 4 is diagram illustrating correction of judged values (DEL)

The present invention is thus arranged that information obtained by the steering angle detecting means are considered and if it is judged on the basis of these information that the vehicle is in a straight-ahead running condition, the value for the RECPR is considered to be an error as long as the value of the RECPR obtained by equation (5) is not 0, and the RECPR is corrected accordingly. That is, a wheel speed for the wheels is first detected by the rotational information detecting means and corrected thereafter as illustrated in FIG. 3 (Steps S1 and S2). Then, the RECPR is calculated by using equation (5) and stored (Step S3). Information which are obtained from the steering angle detecting means, e.g. steering angle information from the steering angle detecting means are converted into digital information of 256 levels and it is accordingly determined whether these information are in the range of 126 to 129 (that is, whether the vehicle is in a straight-ahead running condition) (Step S4). If it can be determined that the vehicle is in a straight-ahead running condition and the RECPR is c (rear number)(Step S5), it is determined that this value c is an error due to decompression of a tire and correction is performed to satisfy corrected RECPR =RECPR-c as illustrated in FIGS. 3 and 4 (Step SS).

Thereafter, lateral G is calculated by using equation (4) which is an ordinary step (Step S10) and in case one of the following six conditions is satisfied, a reject process is performed so as not to use the same for calculating the DEL for eliminating degradation in accuracy of the vehicle speed information or eliminating erroneous alarm through disturbances (Step S11).

(1) When the vehicle is running at a low speed of not more than 15 km/h in which the accuracy of the sensor is degraded; (2) When the vehicle is running at a turning radius R of not more than 30 m in which no cornering correction might be performed; (3) When the vehicle is running at a lateral G of not less than 0.2 g in which no cornering correction might be performed; (4) When the vehicle is running at a vertical G of not less than 0.1 g which is a rapidly accelerating or rapidly decelerating condition; (5) When the vehicle is running on a bad road such as a gravel road or on a snowy road; and (6) While the brake is actuated.

Thereafter, the value for the DEL is calculated based on equation (1) and this value for the DEL is accordingly corrected based on equation (3) by using the value for the lateral G and the corrected RECPR (Steps S12 and 13). The value for the corrected DEL is integrated and it is determined whether these values have been accumulated for e.g. five times (Steps S14 and S15).

While it is possible to determine decompression of a tire based on the corrected DEL according to the present invention, variations in data are decreased in Embodiment 1 without decreasing the number of data by performing moving average of data of DEL of large variations which have been obtained during one sampling period, and for further improving the accuracy of determination, these DEL values are averaged per each sampling period, e.g. every five seconds (Step S16). By further performing moving average of the past twelve data of the average values obtained every five seconds (Step S17), determination of decompression is performed by using this value of moving average (Step S18).

Embodiment 2

Figure 5:
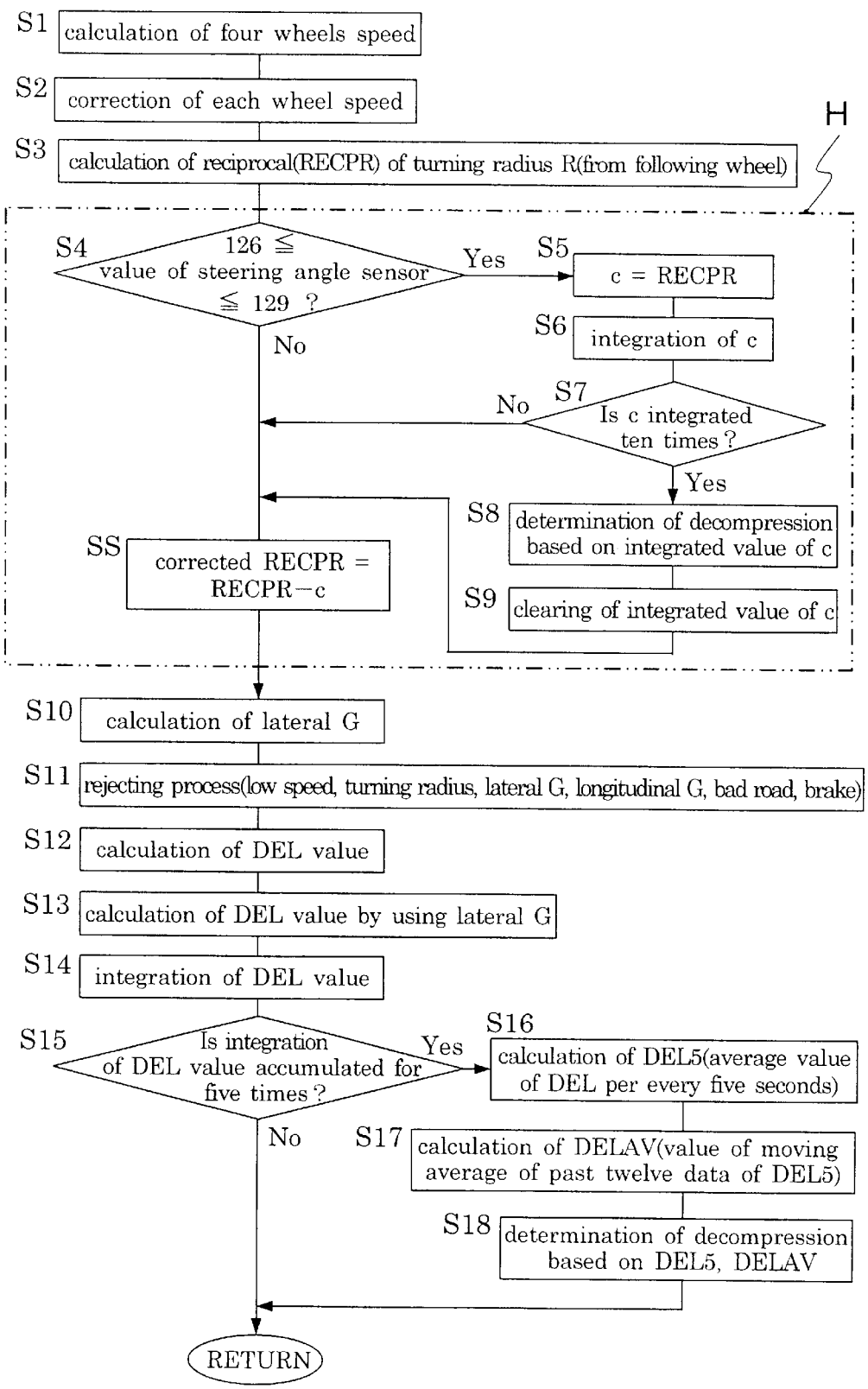
FIG. 5 is another flowchart related to the present invention.
Figure 6:
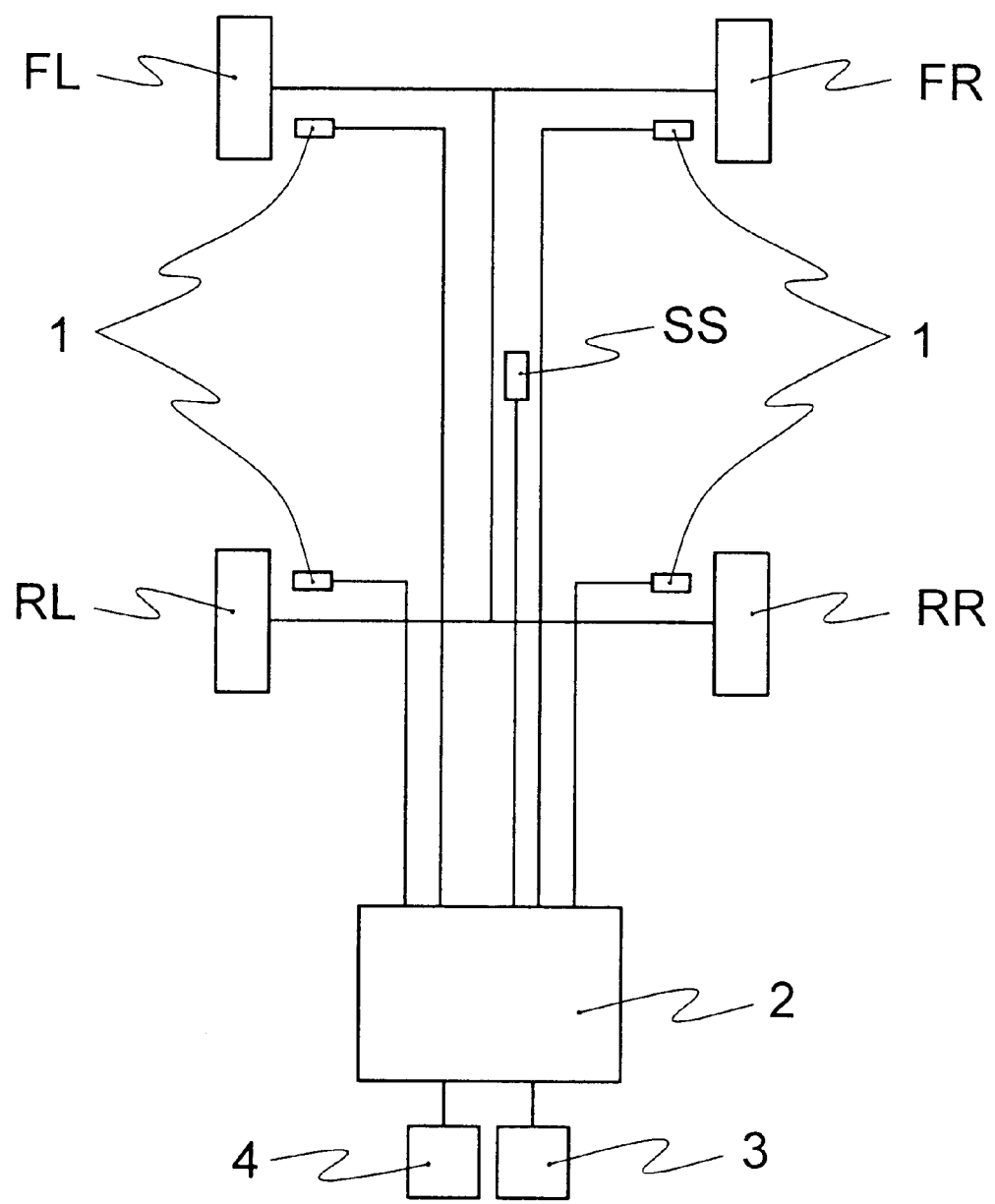
FIG. 6 is a block diagram illustrating Embodiment 3 of the apparatus for alarming decrease in tire air-pressure according to the present invention.

Determination of a decompressed condition of a tire can also be performed according to the present invention on the basis of the value c in a step following the Step S5 as illustrated in FIG. 5. That is, in case it is determined that the vehicle is in a straight-ahead running condition from the steering angle detected by the steering angle detecting means (Step S4), the result of calculation RECPR=c is integrated (Steps S5 and S6). After determining whether integration of c has been performed for e.g. ten times within a specified period (Step S7), in case an absolute value of the integrated value of c (amount of increase) upon performing integration for ten times is not less than a threshold, e.g. 0.02, it might be determined that a tire is in a decompressed condition (Step S8). The integrated value for c is then initialized (Step S9). It should be noted that while the threshold is set to be the integrated value within a specified period in the present Embodiment 2, it is also possible to set the threshold to be a specified value, for instance, 0.002, without performing integration.

In determining decompression of a tire, it is also possible to calculate the RECPR not only from the following wheels but also from the driving wheels. Such calculation might be made by using the following equation (6), similar to the equation (5).

$$RECPR2=\{(VEL1-VEL2)/(VEL1+VEL2)\times FT_{WD}\}/(1+4\times V^2\times \text{constant } 4/ (2\times 9.8\times FT_{WD}) \quad (6)$$

Here, $FT_{WD}$ denotes a tread width (m) of the front tires and the constant 4 might be obtained through running tests.

Correction is then performed to satisfy corrected RECPR2=RECPR2−c2 similar to the above method, and in case an absolute value of c2 (real number) is not less than a specified threshold or in case an absolute value of an integrated value (amount of increase) of c2 within a specified period is not less than a specified threshold, it is determined that a tire is in a decompressed condition.

The present invention will now be explained on the basis of examples while it should be noted that the present is not limited to these examples.

EXAMPLE 1

A domestic FF vehicle of 1,600 cc was employed to which summer tires (size of tire: 185/65R14) were attached. The vehicle was provided with a wheel speed sensor and a steering angle sensor such that rotational information of the four wheels and steering angle information could be stored in a personal computer. The steering angle information from the steering angle sensor was stored in the personal computer as digital information of 256 levels ranging from 0 (full steering to the left) to 255 (full steering to the right) wherein average values per each second were stored. In case of this vehicle, it was considered that the vehicle was in a straight-ahead running condition when these values were in the range of 126 to 129.

The tire air-pressure of the rear right wheel of the vehicle was then decompressed by 50% and the vehicle was made to run a test course of which turning radius R of a left curve was known to be 150 m and 110 m, respectively.

COMPARATIVE EXAMPLE 1

The vehicle was made to run the same test course as Example 1 with a conventional DWS system being mounted thereon. Only the wheel speed of the four wheels was calculated by using the personal computer without performing the steps in the range H in FIGS. 3 and 5.

It was found that an accurate RECPR could be calculated in Example 1 by calculating the reciprocal of the turning radius RECPR (1/400) based on the turning radius 400 m obtained from the following wheels at the time of straight-ahead running, obtaining the straight-ahead running condition from the steering angle sensor, and correcting the RECPR (reciprocal of the turning radius) accordingly.

Since the turning radius R obtained from the following wheels at the time of straight-ahead running was 400 m (the RECPR was 1/400=0.0025) and the calculated turning radius R was tighter than the threshold turning radius R of 500 m (the RECPR being 1/500=0.002), a decompressed condition was determined and alarm was issued accordingly.

In contrast thereto, an erroneous turning radius was calculated in Comparative Example 1 although the vehicle performed running in the same manner, and no alarm was issued.

EXAMPLE 2

Tires of the left front wheel and the left rear wheel of the vehicle as used in the above Example 1 were respectively decompressed by 50% and the vehicle was made to run within the city. Processes similar to those of Example 1 were performed thereafter.

COMPARATIVE EXAMPLE 2

The vehicle was made to run within the same city as in Example 2 with a conventional DWS system being mounted thereon. Only the wheel speed of the four wheels was calculated by using the personal computer without performing the steps in the range H in FIGS. 3 and 5.

An alarm was issued in Example 2 since both the corrected coefficients c and c2 of the RECPR of the following wheels and the RECPR2 of the driving wheels exceeded their thresholds.

In contrast thereto, no changes were seen in the judged value (DEL value) in Comparative Example 2 so that no alarm was issued.

Embodiment 3

Embodiment 3 of the present invention will now be explained. In Embodiment 3, the apparatus is provided with normal rotational information detecting means each provided in relation with each tire $W_i$ and with a lateral acceleration (lateral G) sensor SS for detecting acceleration in lateral directions of the vehicle. A positive value is defined in case this lateral G acts on the left side with respect to a moving direction. The lateral G sensor SS might be a piezoelectric or strain gauge type acceleration converter. It should be noted that it is alternatively possible to employ a yaw rate sensor instead of the lateral G sensor for obtaining the lateral G on the basis of values obtained by this sensor. In case a system for controlling spinning movements or similar during running for the purpose of stabilizing the posture of the vehicle is provided as it is the case with some of the currently available vehicles, it is possible to use an acceleration sensor or yaw rate sensor mounted on the vehicle. The calculating processing means and judged value correcting means of the present Embodiment 3 are included in the control unit 2.

According to the present Embodiment 3, the accuracy of the DWS can be improved on the basis of lateral G obtained by the lateral G sensor and it is thus possible to detect decompression of a tire in a more rapid manner.

The constant 1 and constant 2 of the above equation (3) of Embodiment 3 might be obtained by calculating the vehicle speed obtained by the speed sensor of the vehicle, the lateral G obtained by the lateral G sensor, the DEL and the DFR while making the vehicle run on a curve with the tires being at normal internal pressure.

That is, (1) the vehicle is made to run in a neutral range (at which time DFR=0 is satisfied) and a constant 1 with which the corrected DEL becomes zero, e.g. 0.179 is calculated on the basis of the DEL and the lateral G at this time.

Then, (2) the vehicle is made to run at a constant speed in the driving range, and a constant 2 with which the corrected DEL becomes zero, e.g. 129.02 is calculated on the basis of the DEL, lateral G and DFR.

It should be noted that since the constants 1 and 2 vary depending on the values of the lateral G and DFR, it is preferable to employ mean values of the respective variations.

The present invention will now be explained with reference to an example while the present invention is not limited to this example.

EXAMPLE 3

A domestic 3,000 cc FF vehicle was provided and mounted with a lateral G sensor on a central portion of the vehicle body which was connected to a personal computer. Values of the lateral G were thus arranged to be stored on software within the personal computer. In this manner, the wheel speed of the four wheels and values of the lateral G sensor could directly be stored and reflected in the equation (3) for performing cornering correction.

The vehicle was made to run under the following five conditions on a public mountain road, on a course made to perform stationary turns and on a test course.

1: normal internal pressure
2: tire air-pressure of front left tire decompressed by 30%
3: tire air-pressure of front right tire decompressed by 40%
4: tire air-pressure of rear left tire decompressed by 30%
5: tire air-pressure of rear right tire decompressed by 40%

COMPARATIVE EXAMPLE 3

Only the wheel speed of the four wheels was calculated by using a conventional DWS system, and the lateral G was obtained by using the following equation (4) calculated from the vehicle speed of the following wheels.

$$Lateral\ G = V^2/R/9.8 \qquad (4)$$

According to the results of the Example 3 and the Comparative Example 3, all of the decompressed conditions could be detected in the Example 3 while decompression could not be detected for the front left tire decompressed by 30% when performing stationary turning in Comparative Example 3.

As explained so far, since the present invention is so arranged to obtain an accurate turning radius also in case any tire of the following wheels is decompressed by correcting the turning radius obtained on the basis of rotational information by using the steering angle information, the DEL value might be obtained in a more accurate manner than compared to conventional arrangements. It is further possible to detect decompression and issue alarm also in case both tires on either side of the right and left wheels are simultaneously in a decompressed condition.

Moreover, using the threshold for the turning radius obtained on the basis of rotational information, a decompressed condition of a tire can be determined also in case any tire of the following wheels or the driving wheels is decompressed.

By obtaining the lateral G which is required for cornering correction not through the rotational information detecting means but from a lateral G sensor or a yaw rate sensor, cornering correction might be performed in an accurate manner without being affected by a decompressed condition of a tire. It is accordingly possible to improve the accuracy of detecting decompression of a tire.

What is claimed is:

1. An apparatus for alarming decrease in tire air-pressure based on rotational information obtained from tires attached to a four-wheeled vehicle, comprising: a rotational information detecting means for detecting rotational information of each tire; a steering angle detecting means for detecting a steering angle; a memory means for storing the rotational information of each tire and the steering angle; a turning radius calculating and processing means for calculating a turning radius based on the rotational information of each tire; a judged value calculating and processing means for calculating a judged value based on the rotational information of each tire; and a correction means for correcting the turning radius in case it has been determined by the steering angle detecting means that the vehicle is in a straight-ahead driving condition though the driving condition of the vehicle is a turning condition when being based on the turning radius obtained on the basis of the rotational information.

2. An apparatus for alarming decrease in tire air-pressure based on rotational information obtained from tires attached to a four-wheeled vehicle, comprising: a rotational information detecting means for detecting rotational information of each tire; a steering angle detecting means for detecting a steering angle; a memory means for storing the rotational information of each tire and the steering angle; a turning radius calculating and processing means for calculating a turning radius based on the rotational information of each tire; a correction means for correcting the turning radius in case it has been determined by the steering angle detecting means that the vehicle is in a straight-ahead driving condition though the driving condition of the vehicle is a turning condition when being based on the turning radius obtained on the basis of the rotational information; and a decompression determining means for determining a decompressed condition of a tire in case a correction coefficient for the turning radius as obtained by the correction means is not less than a threshold.

3. The apparatus of claim 2, wherein the threshold is an integrated value in a predetermined time.

4. A method for alarming decrease in tire air-pressure based on rotational information obtained from tires attached to a four-wheeled vehicle, comprising the steps of: detecting rotational information of each tire; detecting a steering angle; storing the rotational information of each tire and the steering angle; calculating a reciprocal of a turning radius based on the rotational information of each tire; calculating a judged value based on the rotational information of each tire; and correcting, when performing correction of the judged value for decompressed condition due to cornering, the turning radius in case it has been determined on the basis of the steering angle that the vehicle is in a straight-ahead driving condition though the driving condition of the vehicle is a turning condition when being based on the turning radius obtained on the basis of the rotational information.

5. A method for alarming decrease in tire air-pressure based on rotational information obtained from tires attached to a four-wheeled vehicle, comprising the steps of: detecting rotational information of each tire; detecting a steering angle; storing the rotational information of each tire and the steering angle; calculating a turning radius based on the rotational information of each tire; correcting the turning radius in case it has been determined on the basis of the steering angle that the vehicle is in a straight-ahead driving condition though the driving condition of the vehicle is a turning condition when being based on the turning radius obtained on the basis of the rotational information; and determining a decompressed condition of a tire in case a correction coefficient for the turning radius as obtained during the correction process is not less than a threshold.

6. The method of claim 5, wherein the threshold is an integrated value in a predetermined time.

7. An apparatus for alarming decrease in tire air-pressure based on rotational information obtained from tires attached to a four-wheeled vehicle, comprising: a rotational information detecting means for detecting rotational information of each tire; a memory means for storing the rotational information of each tire; a calculating and processing means for calculating a judged value based on the rotational information of each tire; and a judged value correcting means for correcting the judged value based on a lateral acceleration obtained through a lateral acceleration sensor provided in the vehicle.

8. An apparatus for alarming decrease in tire air-pressure based on rotational information obtained from tires attached to a four-wheeled vehicle, comprising: a rotational information detecting means for detecting rotational information of each tire; a memory means for storing the rotational information of each tire; a calculating and processing means for calculating a judged value based on the rotational information of each tire; and a judged value correcting means for correcting the judged value based on a lateral acceleration obtained on a basis of values of a yaw rate sensor provided in the vehicle.

9. A method for alarming decrease in tire air-pressure based on rotational information obtained from tires attached to a four-wheeled vehicle, comprising the steps of: detecting rotational information of each tire; storing the rotational information of each tire; calculating a judged value based on the rotational information of each tire; and correcting the judged value based on a lateral acceleration obtained through a lateral acceleration sensor provided in the vehicle.

10. A method for alarming decrease in tire air-pressure based on rotational information obtained from tires attached to a four-wheeled vehicle, comprising the steps of: detecting rotational information of each tire; storing the rotational information of each tire; calculating a judged value based on the rotational information of each tire; and correcting the judged value based on a lateral acceleration obtained on a basis of values of a yaw rate sensor provided in the vehicle.

* * * * *